United States Patent [19]

Beck

[11] 4,396,104

[45] Aug. 2, 1983

[54] VIBRATION ASSISTED SLUICES

[75] Inventor: Jeffrey L. Beck, Ponca City, Okla.

[73] Assignee: Conoco Inc., Ponca City, Okla.

[21] Appl. No.: 232,613

[22] Filed: Feb. 6, 1981

[51] Int. Cl.³ ............................................ B65G 11/00
[52] U.S. Cl. .................................. 193/2 B; 198/557;
198/841
[58] Field of Search ............... 193/2 R, 2 B; 198/557,
198/841, 861, 752, 754, 759, 761, 762, 766, 768;
366/109, 114, 115; 406/86, 92

[56] References Cited

U.S. PATENT DOCUMENTS 3,400,728 9/1968 Di Gennaro ..................... 366/114 X
4,068,755 1/1978 Parkes et al. .................... 198/841 X

FOREIGN PATENT DOCUMENTS 1175356 11/1956 United Kingdom ................ 193/2 B Primary Examiner—John J. Love
Assistant Examiner—Gene A. Church
Attorney, Agent, or Firm—William J. Miller

[57] ABSTRACT

A vibration assisted sluice is constructed with a plurality of trough sections connected end to end and supported above the earth. Each of the sections is yieldably supported so that the individual trough can vibrate to assist in moving the material in the trough. The ends joining one trough with another are vibrationally isolated so that each trough is free to move in its own vibrational mode, independent of adjacent troughs and the support system.

6 Claims, 2 Drawing Figures

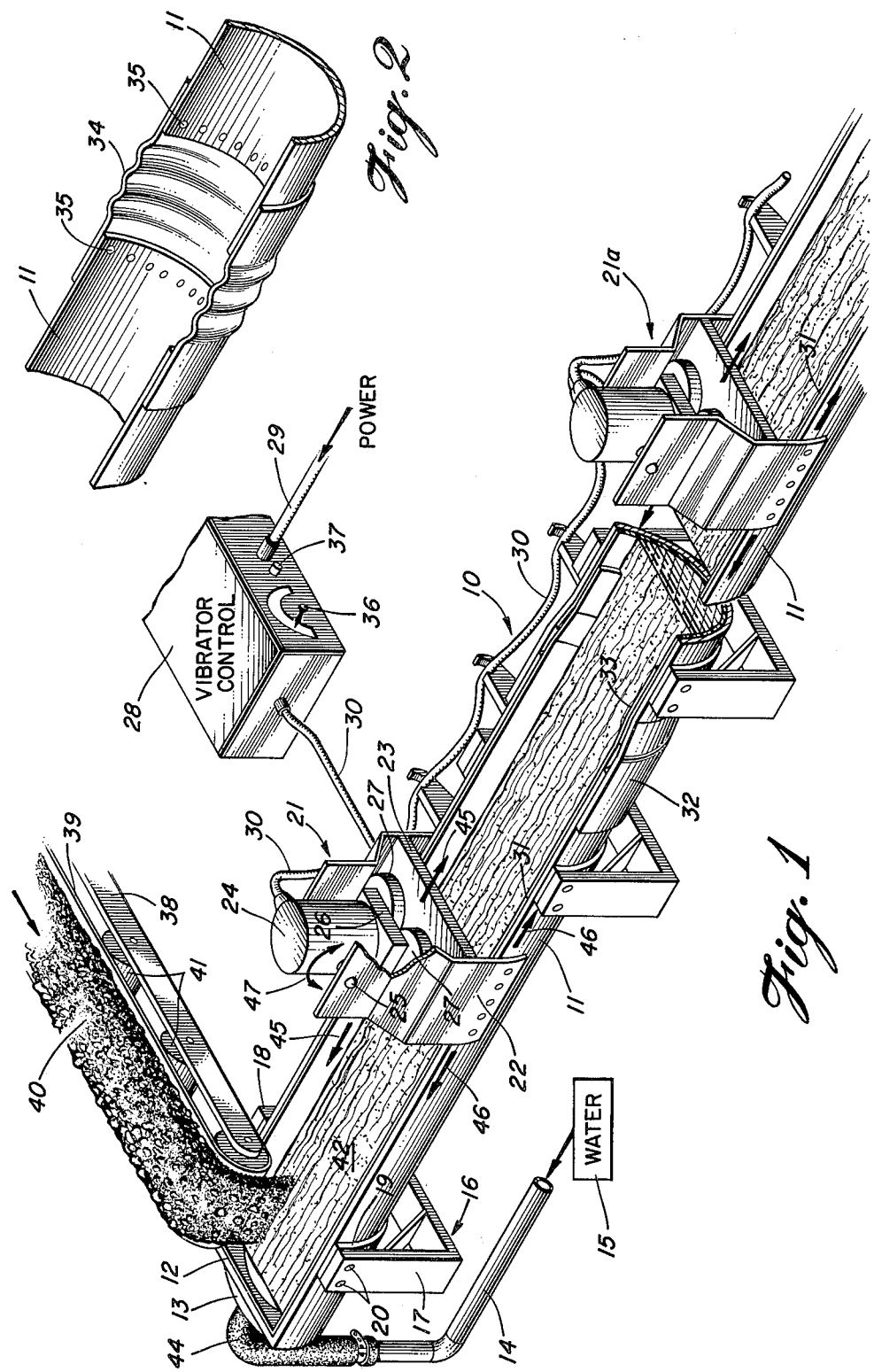

VIBRATION ASSISTED SLUICES

BRIEF DESCRIPTION OF THE PRIOR ART

The best prior art known to applicant is a wet belt conveyer described in U.S. Pat. No. 4,068,755. In this patent a sluice is provided with a means for moving the material down the sluice consisting of a conveyer which is positioned along the bottom of the sluice to maintain the material which drops out of suspension, moving along the sluice, particularly when the sluice is mounted at a angle less than 5° with the horizon. The return belt for the conveyer is along the top of the sluice but appears it could just as well be mounted under the sluice. This conveyer, unfortunately, requires a long conveyer belt operating in fluids which shorten the life considerably of any conveyer system. Furthermore, breakage of the belt at any location will render the entire system inoperative. An additional problem will be the extremely high wear encountered when the conveyer belt, in the presence of an abrasive material such as sand or rock, moves over the bottom of the conveyer causing excessive wear between the belt and the sluice bottom. Vibration has been applied in some conveyer systems where the material is dry and is generally being conveyed uphill.

BRIEF DESCRIPTION OF THE INVENTION

This invention describes a method for constructing a sluice for conveying material generally at an incline downwardly at angles less than 5°. When the angle is greater than 5°, sluicing of slurry, for example, is not normally a problem, since the slurry will move along the sluice with a velocity sufficiently high to maintain the particles in suspension. When the angles are less than 5°, however, measures must be taken to either maintain the particles in suspension or move the particles which tend to settle out in some manner. U.S. Pat. No. 4,068,755, above described, moves the particles by a by a conveyer. Other patents have described systems for lining the conveyer with a slick material such as glass or plastic; however, when the sluice angle becomes less than 8°, even the plastic or slick material no longer will move material which falls out of suspension. This invention contemplates maintaining the particles in suspension by causing the particles to remain fluid. The fluidizing by vibrating the sluice or individual trough members of the sluice will have a vibration frequency and magnitude sufficient to maintain the particles in a fluid state as they move down the sluice. The frequency and magnitude can vary, depending upon the angle of the sluice with the horizon, the material being conveyed, and the matter of the two constructions. In the preferred embodiment of the invention if the trough forming the sluice is vibrational, it is isolated from its adjacent trough and from its mounting system. A vibrator is attached to the individual trough members and controlled in magnitude and frequency by a controller which will support sufficient energy and selected frequency which will maintain the slurry passing down the trough in a fluidized state.

BRIEF DESCRIPTION OF THE FIGURES

FIG. 1 is a perspective view of a section of a sluice illustrating the operation of the invention and FIG. 2 is a modified means for interconnecting adjacent trough members.

DETAILED DESCRIPTION OF THE INVENTION

Referring to both of the figures but in particular to FIG. 1, a sluice generally referred to by arrow 10 is composed of a series of individual adjacent trough members 11. The beginning trough member 11 has an end 12 with a manifold 13 which is connected through a pipe 14 to a source of water 15 which is normally under pressure. Trough member 11 is attached to the ground through a mounting 16 which has uprights 17 and 18. A flexible member 19 is connected, for example, with rivets 20 to uprights 17 and 18. In the preferred embodiment trough member 11 also has a vibrator assembly, referred to by arrow 21, attached to it in a manner to develop a force in trough 11. Vibrator assembly 21 comprises side mounting members 22 with an interconnecting member 23 attached thereto in order to make the mounting assembly rigid. A vibrator motor 24 is pivotally attached through bearings 25 to side mounting members 22. The output shaft from motor 24 is attached through a gear box 26 to a pair of swinging weights 27. A vibrator control system 28 is driven by a source of power through wire 29. The output from vibrator control system 28 is supplied through a cable 30 to each of the vibrators along the sluice such as, for example, 21 and 21a. The coupling between each of the troughs 11 must provide vibration isolation and yet be substantially fluid tight. In the embodiment shown in FIG. 1 each trough member 11 is lined in plastic as illustrated by liner 31. In order to provide a vibration isolation between trough members, the mating of the succeeding trough 11 is flared at location 32 to perform a fairly water-tight seal. Sealing is also assisted by an extension 33 of plastic liner 31, so that it overlaps a portion of the plastic liner 31 in the succeeding trough member. Thus the substantially water-tight seal is provided both with the overlapping plastic liner 33 and the overlapping metallic portion 32.

FIG. 2 illustrates another method of joining two trough members 11 and is accomplished by coupling the succeeding trough members 11 by a flexible cloth-like portion 34 which is attached to trough members 11 by any means such as rivets 35. Other couplings can be used in lieu of either of the above illustrated.

Since conditions may vary, the actual vibration generated by vibrator assembly 21 may need to be changed. To accomplish the above, a control 36 is provided on vibrator control 28. An amplitude control 37 is also provided so that the force or frequency generated by vibrator assembly 21 can be varied in accordance with the needs of the particular sluice. The two may be fed in any usual manner such as, for example, a conveyer 38 which has a belt 39 carrying material 40. Belt 39 is supported by rollers 41 as is well known in the art.

OPERATION

The vibration assisted sluice basically operates by maintaining the liquid and solid in suspension in each of the trough members as the liquid and material pass from one trough member to the next. The above is accomplished by causing sufficient vibration within the individual trough members to cause fluidization of the solid-liquid slurry within the trough.

Initially, water is fed from source 15 through pipe 14 into manifold 13 which distributes the water across trough 11. As a consequence trough 11 and succeeding trough 11 are filled with water which will flow to an exit to the trough not shown. Conveyer 38 then turns on and belt 39 moves to transfer material 40 into sluice 11 near the end 12 of sluice 11 where material 40 is mixed with water 42 and moved down sluice 11. Once the material leaves the region where water is being added, it will normally settle out rapidly if the sluice is at an angle of 5° or less. In order to maintain the material in suspension, vibrator motor 24 is operated by supplying power through wire 29 to vibrator control 28. The amplitude and frequency are initially selected by advance control 37 and 36, respectively, to a predetermined frequency and amplitude. The information is communicated down cable 30 to the vibrator motor 24 which rotates, causing rotation of gears in gear box 26 which communicates the rotation to weights 27 generally in the direction of arrows 45 which is, in the preferred embodiment, along the axis of trough 11. The force along arrows 45 will be communicated to the weight mounting member 22 which generates force in the actual trough along arrows 46. The force is generally along the sluice axis, however, the bearings 25 will permit rotation of the vibrator 24, gear box 26, and eccentric weights 27 in the direction of arrow 47. Rotation either clockwise or counterclockwise, illustrated by arrow 47, will cause a force to be generated in side mounting member 22 along a direction other than the axis of trough 11 which, in some instances, could assist in the movement of particles along the trough.

As previously described, the flare at location 33 and the plastic liner overlapping the succeeding trough 11 at location 33 could be used to prevent water from flowing out of the coupling between succeeding trough 11.

It is obvious, of course, that no undue effect will necessarily result from water flowing out of the trough coupling except that it will tend to further reduce the desired concentration of the fluid to solid mixture in the trough, rending it more difficult to move down the trough. Furthermore, excessive water leakage will make it unpleasant for miners working in the area of the sluice.

The embodiment illustrated in FIG. 2 will provide a simple flexible coupling which will not leak but which will generate friction to the flow of material across the point having very shallow angles of mounting of the sluice which may be sufficient to cause tube breakage. Rivets have been shown to attach flexible portion 34. It is obvious that one side or the other could incorporate some source of quick connect or disconnect system, such as a band with clamps.

The trough will be isolated from the ground in any ordinary manner. Flexible straps 19 are illustrated supporting the trough above the ground on mounts 16. The trough could be suspended, however, with supporting rods or other systems which provide horizontal movement of the trough. In fact the entire trough system could be supported from the roof of the mine. It would be preferable for a portion of pipe 14 to be flexible, and the above can be accomplished by means of hose 44 coupling pipe 14 to manifold 13. It is further contemplated that one portion of the sluice may require one vibrational frequency and amplitude while another portion of the sluice may require a second frequency and amplitude. A swinging weight vibrator has been used as illustrative only. It is obvious that any type vibrator can be used such as a hydraulically-operated vibrator or electromechanical vibrator, for example. Such is well within the scope of the teachings of this invention, and it is obvious that changes can be made in the mechanical arrangement and still be within the spirit and scope of the invention as disclosed in the specification and appended claims.

What is claimed is:

1. A vibration assisted sluice comprising:
    (a) a plurality of trough sections having a longitudinal axis;
    (b) earth support means;
    (c) means yieldable mounting each of said plurality of trough sections to said earth support means whereby said troughs are free to oscillate in a longitudinal direction without transmitting a substantial percentage of said vibration force to said earth support means;
    (d) means for isolatably coupling one trough to an adjacent trough to permit movement of fluid without substantial liquid leaking from the trough while permitting the trough freedom of longitudinal movement while it is being vibrated;
    (e) longitudinal vibration means attached to said troughs; and
    (f) vibration control means coupled to said vibration means whereby fluids and solid material, when added to said sluice, will be maintained in a fluidized condition as said fluids and solids move down the succeeding trough sections of said sluice.

2. A vibration assisted sluice as described in claim 1 wherein each trough has a vibrator means mounted thereon.

3. A vibration assisted sluice as described in claim 1 or 2 wherein said vibrator control means communicates a signal to said vibrator means that is variable in frequency so that the best frequency can be set by the vibrator control means for the particular installation and material being sluiced.

4. A vibrator assisted sluice as described in claim 1 or 2 where said trough is mounted to the earth at an angle less than 5° with the horizontal.

5. A vibrator assisted sluice as described in claim 1 wherein said vibrator control means is variable in frequency and where the force generated is along the axis of the trough.

6. A vibration assisted sluice as described in claim 5 wherein said trough is mounted to the earth at an angle less than 5° with the horizontal.

* * * * *